(No Model.) 2 Sheets—Sheet 1.
O. T. BUGG.
MACHINE FOR REMOVING LINT FROM COTTON SEED.
No. 446,321. Patented Feb. 10, 1891.
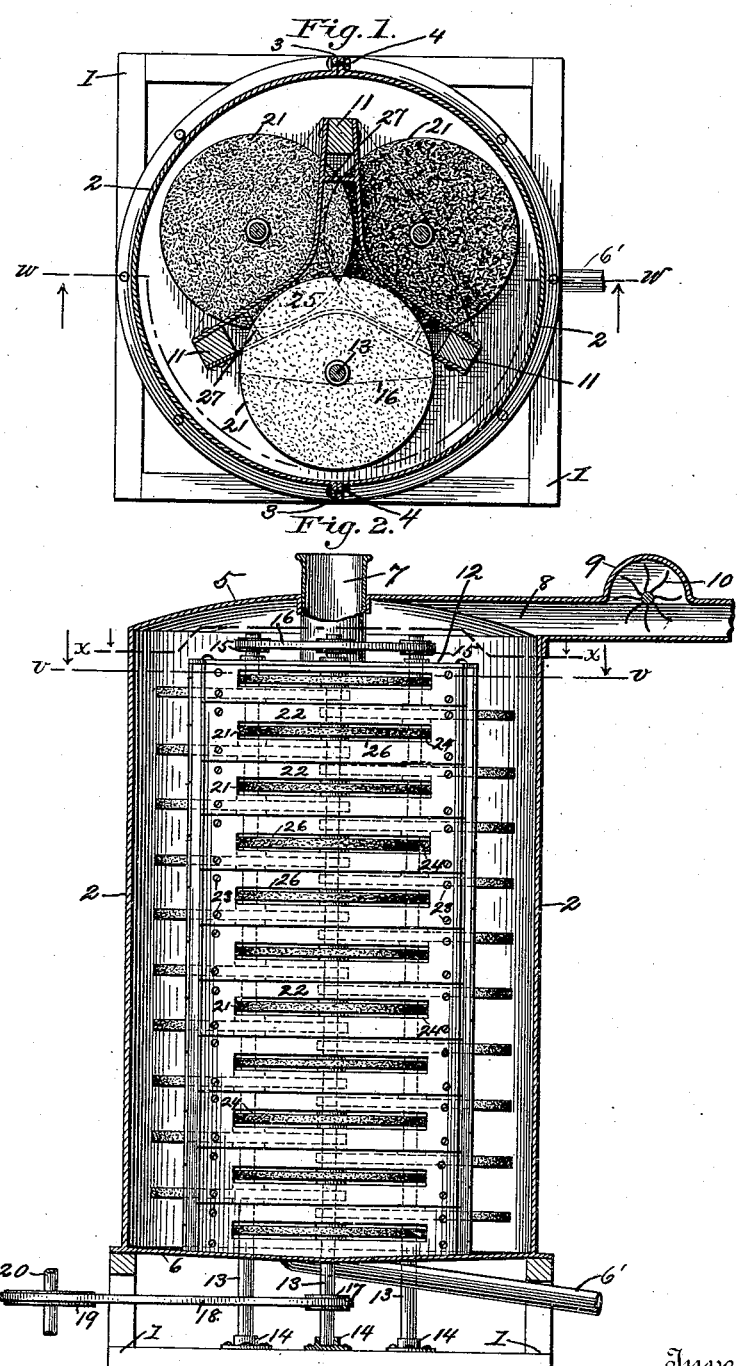
Witnesses
H. W. Elmore
W. L. Hillyer
Inventor
Owen T. Bugg.
By Marble & Mason,
Attorneys.

(No Model.) 2 Sheets—Sheet 2.
O. T. BUGG.
MACHINE FOR REMOVING LINT FROM COTTON SEED.
No. 446,321. Patented Feb. 10, 1891.
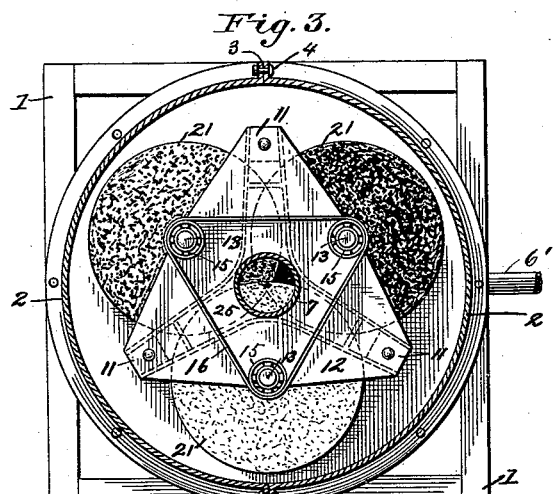
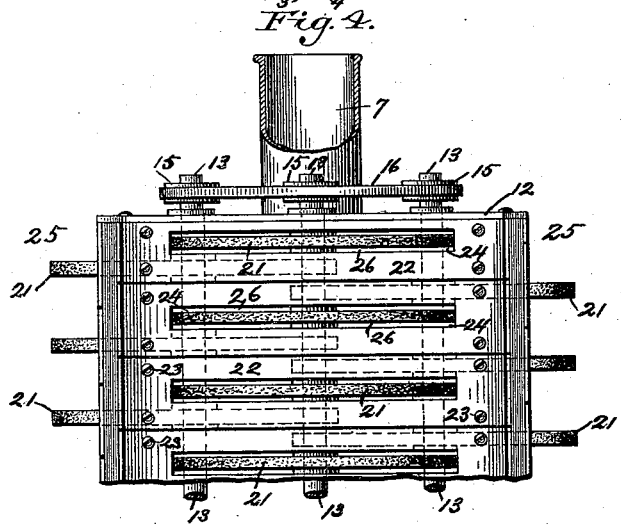
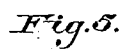
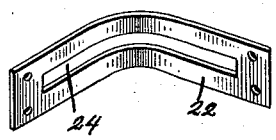
Witnesses
H. W. Elmore
W. L. Hillyer
Inventor
Owen T. Bugg.
By Marble + Mason,
Attorneys

UNITED STATES PATENT OFFICE.

OWEN T. BUGG, OF NEWARK, NEW JERSEY, ASSIGNOR TO THE AMERICAN MANUFACTURING EXPORT COMPANY, OF SAME PLACE.

MACHINE FOR REMOVING LINT FROM COTTON-SEED.

SPECIFICATION forming part of Letters Patent No. 446,321, dated February 10, 1891.

Application filed September 25, 1889. Serial No. 325,045. (No model.)

*To all whom it may concern:*

Be it known that I, OWEN T. BUGG, a citizen of the United States, residing at Newark, in the county of Essex and State of New Jersey, have invented certain new and useful Improvements in Machines for Removing Lint from Cotton-Seed; and I do hereby declare the following to be a full, clear, and exact description of the invention, such as will enable others skilled in the art to which it appertains to make and use the same.

My invention relates to machines for removing the short soft fiber or lint from cotton-seed after the same have undergone the ginning process, whereby the seed may be placed in proper condition for planting or for grinding and pressing in the manufacture of oil and oil-cake.

Ginned cotton-seed have hitherto generally been stripped of their lint by submitting them to acid baths, by cracking and removing the hard shells which surround their kernels, and by treating them between surfaces formed of emery and wires or card-clothing. These operations are practically objectionable in that the acid is retained by the seed to some extent, thus injuring the oil, rendering the oil-cake unfit for stock-food, and unfitting a large proportion of the seeds for planting; also, the cracking and removing of the hard shells is very wasteful, as it renders them and the lint almost worthless, while in the treatment of the seed between the emery and card-clothing surfaces the wire teeth soon become clogged by the dirt and lint, which results in the choking and consequent damage of the machine and in the passage therethrough of seed from which the lint has not been entirely removed.

The objects of my invention are to overcome these and other defects in existing processes and machines for linting cotton-seed and to provide a machine in which the lint is removed in an efficient and thorough manner and every particle saved, (which constitutes a very valuable product for many purposes,) and in which at the same time the seed are uninjured, thoroughly cleaned, and left in perfect condition for either planting or manufacture into oil and oil-cake.

To these ends my invention consists in the novel and improved constructions and arrangements or combinations of parts hereinafter fully disclosed in the description, drawings, and claims.

In the accompanying drawings, forming part of this specification, and in which the same reference-numerals indicate the same parts, Figure 1 represents a horizontal section of my improved machine on the line $v\ v$ of Fig. 2, looking downward; Fig. 2, a vertical section of the same on the line $w\ w$ of Fig. 1, looking downward, the front vertical shaft being shown in dotted lines within the casing in order to not obstruct a full view of the front ribs; Fig. 3, a horizontal section through the casing and hopper on the line $x\ x$ of Fig. 2, looking downward; Fig. 4, an enlarged broken detail view of a portion of the upper part of the seed-retaining chamber, the casing being omitted and the front vertical shaft shown in dotted lines in order to not obstruct a full view of the front ribs; and Fig. 5, an enlarged detail view of one of the ribs.

In the drawings, the numeral 1 indicates a rigid frame or support for the machine, upon which is mounted a vertical cylindrical two-part casing 2, which is formed of sheet metal and provided with outwardly-projecting flanges 3, which are removably connected by the nutted screw-bolts 4, and with the interiorly-concaved top and bottom plates 5 and 6, the former having the hopper 7 suitably mounted therein and the latter having the centrally-communicating and laterally-extending discharge-pipe 6', which forms the outlet for the cleaned or lint-stripped seed. At the upper part or top of this casing, communicating therewith and projecting at right angles therefrom, is secured a pipe 8, which is provided with a fan-casing 9 and suction-fan 10 for withdrawing the fibers or lint removed from the seed during the operation of machine.

Within the casing 2 are suitably secured three supports or uprights 11, which are triangularly arranged, placed at equal distances from each other, and project upwardly nearly to the top of said casing, where they are secured to a triangularly-shaped plate 12, as shown in Fig. 3; also, within this casing, at equal distances from said uprights and from each other, are placed three triangularly-arranged vertical shafts 13, which pass through the bottom of said casing and rest at their lower ends in suitable bearings 14, which may be rendered adjustable, if necessary or desired, by any of the well-known devices for this purpose. These shafts at their upper ends extend through the triangular plate 12 and are provided with the pulleys 15 and the endless belt 16 or other suitable gearing for revolving them in the same direction. Motion is imparted to these shafts through a pulley 17 on the lower portion of one of them, an endless belt 18, and a pulley 19 on the power-shaft 20.

Upon each of the vertical shafts 13 are secured at suitable distances apart a series of horizontal emery-disks 21, which underlap and overlap or alternate with the disks of corresponding form and material upon the other vertical shafts, the extent to which said disks underlap and overlap each other being, preferably, about one-sixth of their diameters; but, of course, I do not limit myself in this respect, as it is only necessary that those of one shaft alternate with and revolve between those of the other shafts.

At intervals or points corresponding to the edges or peripheries of the disks 21 a series of curved triangularly-arranged ribs 22 are attached to the three uprights 11, being preferably secured thereto at their ends by bolts or screws 23, so as to be removable for repairs, renewal, and the like. Access to the ribs for these purposes is permitted by the removability of the two parts of the casing 2. One of these curved ribs is provided for each disk and formed with a rectangular opening or slot 24, through which a portion of said disk protrudes after the manner of a saw-disk projecting between two of the ribs of a saw cotton-gin; also, all of these ribs are vertically arranged to correspond to the arrangement of the disks or to underlap and overlap or alternate with the disks upon the shafts which are next adjacent thereto, the rectangular slots in said ribs, like said disks, being out of alignment horizontally. Under this construction and arrangement of the ribs it will be obvious that they constitute a vertical substantially triangular chamber 25, which is closed on all sides except at the small spaces 26 left between the upper and under surfaces of the disks and the walls of the rectangular slots through which portions of said disks project and revolve. These spaces are just large enough to permit the emery-disks to carry therethrough the lint removed from the cotton-seed by the pulling and abrasive action of said disks. The partially-stripped seed are retained within this chamber, kept in a state of agitation and rotation, and caused to descend from disk to disk in a circuitous or zigzag course over their inner and overlapping edges until the bottom of said chamber is reached, when they will be in a perfectly-clean state or deprived of all lint. As assisting in retaining the cotton-seed at or near the central part of the chamber 25, and also as strengthening the ribs, the latter are connected in pairs near their outer ends by the small vertical plates 27, as shown in Figs. 1 and 3.

In addition to what is apparent and partially described the operation of my machine is as follows: Rotary motion being imparted to the power-shaft 20 and the pulley 19, the same motion is transmitted through the belt 18 to the pulley 17, and thence through one of the vertical shafts to the pulleys 15 and the endless belt 16 upon the upper ends of the shafts 13, the result being that the disks 21 are revolved at a very high rate of speed. Then the cotton-seed with the lint thereon, or in the condition which they are when they leave the cotton-gin, are fed through the hopper in any necessary or regulated quantity, according to the capacity of the machine, and fall upon the upper rapidly-revolving emery-disks 21, which spread them out evenly upon and between their overlapping and underlapping inner portions, which are arranged within the upper part of the triangular seed-retaining chamber 25, and which remove a portion of the lint therefrom and carry the same through the small spaces 26 existing between their upper and under faces and the walls of the rectangular slots 24 and out into the annular spaces between their peripheries and the inner surface of the casing 2. Then the partially-stripped seed pass on down through said chamber in a circuitous or zigzag course, or from disk to disk, and over and under the upper and lower faces of their inner portions, each of said disks removing from the seed and carrying out of said seed-retaining chamber an additional portion of the lint until the last disk at the bottom of said chamber has been reached and passed, when the seed will be completely stripped of all their lint and passed out of the bottom of the casing through the laterally-extending discharge-pipe 6'. During this removal or abrasion of the lint and the passage of the same out of the seed-retaining chamber and into the space between the same and the inner surface of the casing the suction-fan 10 is also set in operation by any suitable or ordinary means and draws the lint upward and into the suction-pipe 8, whence it is delivered into any suitable receptacle.

The abrading or lint-stripping disks 21 may be made of other substances or materials than emery; but I prefer to use emery for the reason that it is not liable to be worn smooth by contact with grit or sand, or with cotton-seed, which is always more or less oily.

From the foregoing it will be obvious that the lint is rapidly and efficiently separated from the seed and carried away to any suitable receptacle to be afterward employed for many useful purposes, that the cleaned seed are discharged in perfect condition for planting or manufacture into oil and oil-cake, and that the revolving emery-disks, while thoroughly removing the lint from the seed, do not injure them in the slightest, nor do they in any manner damage the fiber itself.

Having thus fully described the construction and arrangement or combination of the several parts of my invention, with its operation and advantages, what I claim as new is—

1. In a machine for removing lint from cotton-seed, the combination, with a vertical casing containing a vertical seed-retaining chamber which is formed with openings or slots in its sides, of a vertical series of overlapping revolving abrasive disks which revolve in said openings or slots, substantially as and for the purpose described.

2. In a machine for removing lint from cotton-seed, the combination, with a vertical casing containing a vertical seed-retaining chamber which is substantially triangular in shape and formed with openings or slots in its sides, of a series of vertically and triangularly arranged overlapping abrasive disks which revolve in said openings or slots, substantially as and for the purpose described.

3. In a machine for removing lint from cotton-seed, the combination, with a vertical casing and a vertical separately-secured series of ribs mounted therein and formed with openings or slots, of a vertical series of overlapping revolving abrasive disks which revolve in said openings or slots, substantially as and for the purpose described.

4. In a machine for removing lint from cotton-seed, the combination, with a vertical casing and a vertical triangularly-arranged series of uprights, of a series of curved and triangularly-arranged ribs secured to said uprights and formed with openings or slots, and a series of vertically and triangularly arranged overlapping abrasive disks which revolve in said openings or slots, substantially as and for the purpose described.

5. In a machine for removing lint from cotton-seed, the combination, with a vertical casing, a vertical triangularly-arranged series of uprights, and a triangular securing-plate at their upper ends, of a series of curved and triangularly-arranged ribs secured to said uprights and formed without openings or slots, and a series of vertically and triangularly arranged overlapping abrasive disks which revolve in said openings or slots, substantially as and for the purpose described.

6. In a machine for removing lint from cotton-seed, the combination, with a vertical casing and a vertical triangularly-arranged series of uprights, of a series of curved and triangularly-arranged ribs which are removably secured to said uprights and formed with rectangular openings or slots, and a series of vertically and triangularly arranged overlapping abrasive disks which revolve in said openings or slots, substantially as and for the purpose described.

7. In a machine for removing lint from cotton-seed, the combination, with a vertical two-part casing, devices for removably securing its parts together, the vertically-arranged uprights, and the curved ribs, of means for removably securing said ribs to said uprights, substantially as described.

8. In a machine for removing lint from cotton-seed, a rectangularly-shaped rib formed with a rectangular opening or slot and curved or bent to an angle, substantially as described.

9. In a machine for removing lint from cotton-seed, a rectangularly-shaped rib formed with a rectangular opening or slot and curved or bent to an angle, in combination with a horizontally-arranged and revolving abrasive disk which projects into said opening or slot, substantially as described.

10. In a machine for removing lint from cotton-seed, the combination, with a vertical casing containing a vertical seed-retaining chamber which is formed with openings or slots in its walls, of a vertical series of overlapping abrasive disks which revolve in said openings or slots, and a suction-fan communicating with the top of said casing, substantially as and for the purpose described.

11. In a machine for removing lint from cotton-seed, the combination, with a vertical casing provided with interiorly-concaved top and bottom plates having, respectively, a hopper and a discharge-pipe, a suction-pipe and fan, and containing a vertical seed-retaining chamber which is formed with openings or slots in its walls, of a vertical series of overlapping abrasive disks which revolve into said openings or slots, substantially as and for the purpose described.

12. In a machine for removing lint from cotton-seed, the combination, with a vertical casing containing a vertical seed-retaining chamber which is formed with openings or slots in its walls, of three triangularly-arranged vertical shafts provided with overlapping abrasive disks which revolve in said openings or slots, and means for revolving said shafts and disks in the same direction, substantially as described.

13. In a machine for removing lint from cotton-seed, the combination, with a vertical casing containing a vertical seed-retaining chamber which is formed with openings or slots in its walls, of three triangularly-arranged vertical shafts provided with overlapping abrasive disks which revolve in said openings or slots, and means for revolving said shafts and disks in the same direction, said means consisting of a power-shaft having its pulley arranged on a line beneath the casing, an endless belt, a pulley upon the lower portion of one of the vertical shafts, three pulleys upon the upper ends of said shafts, and an endless belt connecting the same, substantially as described.

14. In a machine for removing lint from cotton-seed, the combination, with a triangularly-arranged series of ribs formed with rectangular openings or slots and provided near their outer ends with small vertically-arranged plates, of a series of overlapping abrasive disks which revolve in said openings or slots, substantially as and for the purpose described.

15. In a machine for removing lint from cotton-seed, the combination, with a casing, uprights secured therein, and a series of triangularly-arranged curved ribs secured to said uprights, formed with rectangular openings or slots and provided near their outer ends with small vertically-arranged plates, of a series of overlapping abrasive disks which revolve in said openings or slots, substantially as and for the purpose described.

In testimony whereof I affix my signature in presence of two witnesses.

OWEN T. BUGG.

Witnesses:
TOM R. STUART,
JOS. L. COOMBS.